United States Patent [19]

Miller

[11] Patent Number: 4,525,243
[45] Date of Patent: Jun. 25, 1985

[54] APPARATUS FOR DESALINATING WATER

[75] Inventor: Stanley Miller, Portland, Oreg.

[73] Assignee: J. Stanley Miller Corporation, Portland, Oreg.

[21] Appl. No.: 586,035

[22] Filed: Mar. 5, 1984

[51] Int. Cl.$^3$ .......................... B01D 1/28; B01D 3/10
[52] U.S. Cl. .................................... 202/181; 202/205; 203/11; 203/22; 203/24; 203/26; 203/100; 203/DIG. 8; 203/DIG. 17
[58] Field of Search .................. 202/205, 181; 203/22, 203/26, 24, 100, 11, DIG. 8, DIG. 17

[56] References Cited

U.S. PATENT DOCUMENTS

| | | | |
|---|---|---|---|
| 1,966,938 | 7/1934 | Stone | 203/26 |
| 3,890,205 | 6/1975 | Schmitzer | 203/22 |
| 4,176,012 | 11/1979 | Bryant | 203/11 |
| 4,219,387 | 8/1980 | Gruntman | 203/10 |
| 4,285,776 | 8/1981 | Atwell | 202/205 |
| 4,304,637 | 12/1981 | Robbins | 203/11 |
| 4,366,030 | 12/1982 | Anderson | 203/11 |

OTHER PUBLICATIONS

Perry J. H., "Chemical Engineers' Handbook", Fourth Edition, pp. 6-25.

Primary Examiner—William F. Smith
Attorney, Agent, or Firm—Eugene M. Eckelman

[57] ABSTRACT

A tank for receiving water to be desalinated supports a vacuum pump at the upper end thereof. The inlet of the pump communicates with the tank for reducing the interior of the tank to a subatmospheric pressure and the outlet of the pump communicates with heat transfer coils submerged just below a water level in the tank. The vacuum pump has an outer casing defining a heating area which traps the heat generated by operation of the pump. An inlet for water to be desalinated leads through the heated area around the pump and is discharged above the water level at the heat transfer coils for vaporization of the incoming water. The heat transfer coils communicate with condensing coils leading downwardly in the tank. The heat transfer coils are supported on a float and have an inlet and outlet arrangement providing for even distribution of vapor.

7 Claims, 3 Drawing Figures

U.S. Patent  Jun. 25, 1985  4,525,243
FIG. 1
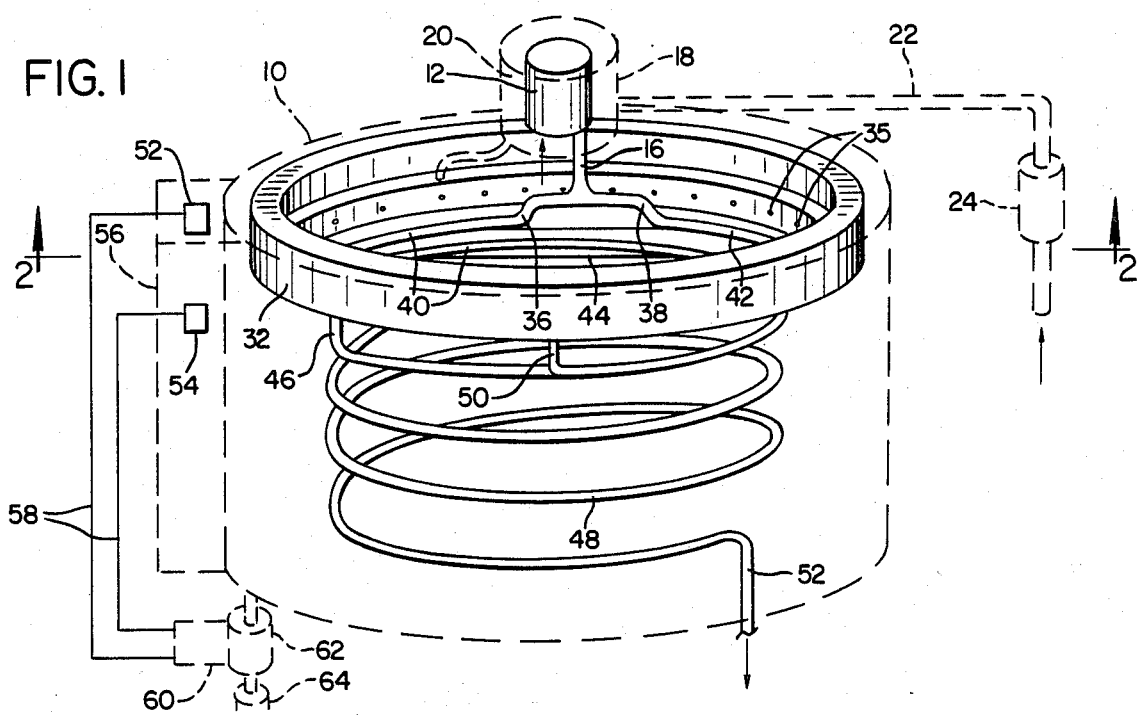
FIG. 2
FIG. 3
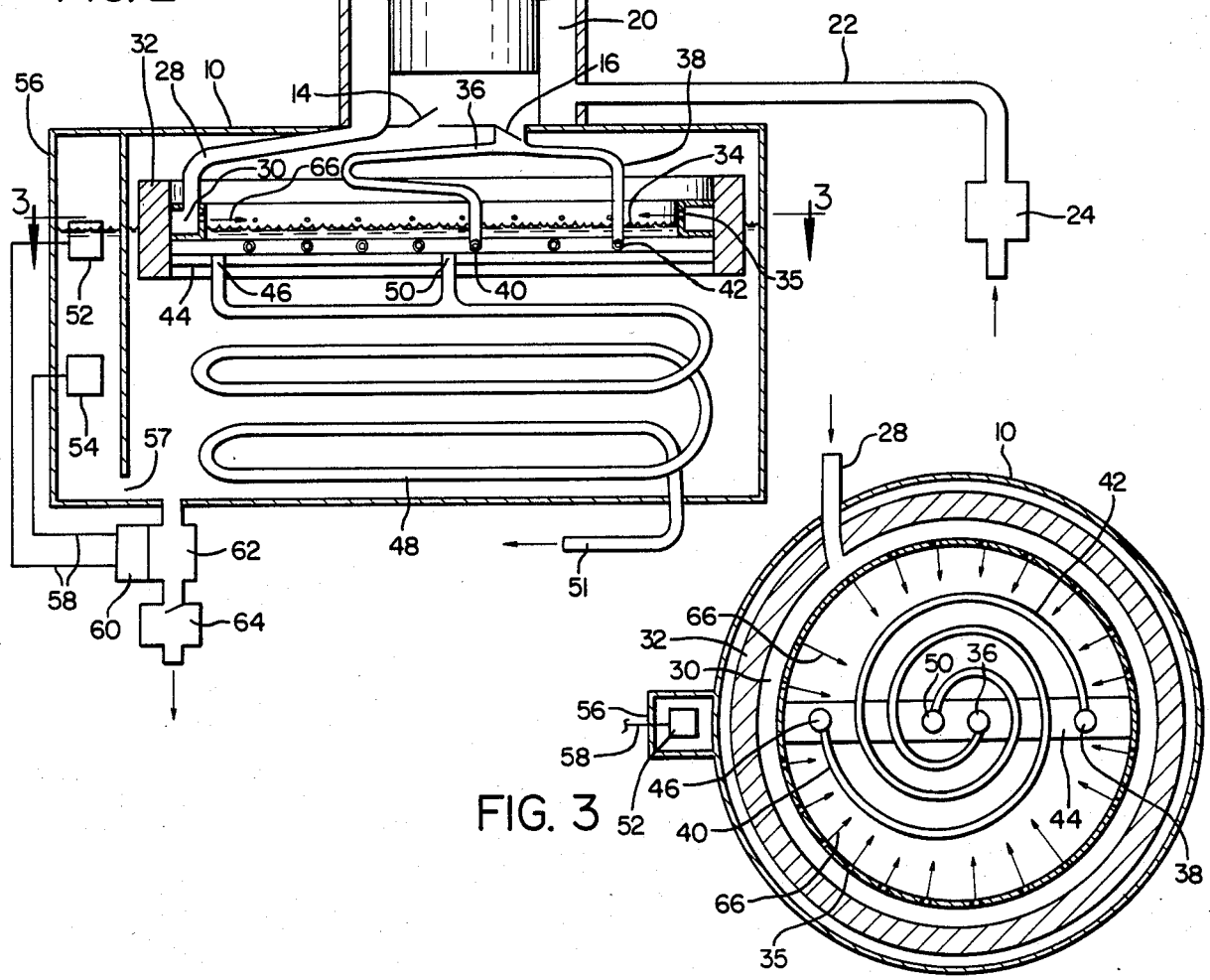

4,525,243

APPARATUS FOR DESALINATING WATER

BACKGROUND OF THE INVENTION

This invention relates to new and useful improvements in apparatuses for desalinating water.

Devices have heretofore been proposed for producing potable water from salinated water, such as sea water. Such devices generally comprise the use of heating elements for vaporization of the salinated water and subsequent treatment to condensing means. Such devices require an immense amount of energy for producing the heat necessary to vaporize the water and thus the cost is not economical as related to the amount of energy required to accomplish the intended purpose. Devices have heretofore been provided which utilize a vacuum chamber associated with the vaporization step whereby the salinated water will boil at a low temperature and thus require considerably less energy for heating. Such devices, however, are not considered to be operable to the extent that they successfully produce a desalinated water at low expense since it is extremely difficult to provide an inlet of salinated water and an outlet of condensation and at the same time provide a continuous subatmospheric pressure.

SUMMARY OF THE INVENTION

According to the present invention and forming a primary objective thereof, an apparatus for desalinating water is provided which is designed to work with minimum energy requirements and which more particularly utilizes an arrangement of structure capable of operating under subatmospheric pressure in a continuous operational function.

A more particular object is to provide apparatus for desalinating water with a novel arrangement of vauum pump and heat transfer means which receives heat from the operation of the vacuum pump and from release of latent heat of condensation for accomplishing vaporization of water to be desalinated.

Still another object of the invention is to provide apparatus of the type described utilizing a novel heat transfer means and float support therefor in a subatmospheric chamber.

In carrying out the objectives of the invention, a tank is provided arranged to receive water to be desalinated and for holding residual water at a selected level. A vacuum pump is provided at the upper end of the tank and has an inlet communicating with the tank for reducing the interior of the tank to subatmospheric pressure. Heat transfer means are submerged in the tank adjacent the water level and communicate with the pump outlet. Heat pickup means are disposed around the pump for receiving heat generated by the operation of the vacuum pump, and inlet means for water to be desalinated leads through the heat pickup means and discharges at the heat transfer means above the liquid level for vaporization of the incoming water. Condensing means lead from the heat transfer means for forming a condensate from vapor forced into the heat transfer means. The inlet means comprises a float for maintaining the discharge of inlet water just above the liquid level, and an outlet manifold is provided on the float having a plurality of apertures directed radially inwardly over the heat transfer means. In a preferred arrangement, the outlet of the vacuum pump has at least two branch lines and the heat transfer means comprises at least two coils leading to the condensing means for even distribution of heat, one of the coils having an inlet centrally of the heat transfer means and an outlet adjacent the manifold, and the other of the coils having an inlet adjacent the manifold and an outlet centrally of the heat transfer means.

The invention will be better understood and additional objects and advantages will become apparent from the following description taken in connection with the accompanying drawings.

BRIEF DESCRIPTION OF THE DRAWINGS

FIG. 1 is a perspective view of the apparatus of the invention, portions of this view being shown in broken lines;

FIG. 2 is a vertical sectional view taken on the line 2—2 of FIG. 1, this view being partially diagrammatic; and FIG. 3, is a sectional view taken on the line 3—3 of FIG. 2.

DETAILED DESCRIPTION OF A PREFERRED EMBODIMENT

With particular reference to the drawings, the invention comprises a tank 10 on which is supported a vacuum pump 12. This pump is of the positive action type such as a piston pump and has an inlet 14 and an outlet 16. Pump 12 has an outer casing 18 preferably insulated, and this casing is enlarged relative to the pump casing to form an area 20 between the pump and the casing commonly referred to as a water jacket. The conduit 22 from an inlet source of salinated water leads into the area 20 wherein incoming water circulates around the pump housing. Conduit 22 has a valve 24 therein which controls the rate of flow of water to be desalinated. The rate of flow may be regulated manually or by a sensor which detects rate of change of water level in the tank, to minimize fluctuations of the water level. Area 20 serves as a heating area for water being admitted and utilizes heat from operation of the vacuum pump to heat such incoming water.

Area 20 has an outlet conduit 28 leading to a circular manifold 30 integral with a circular float 32 which maintains the manifold just barely above the liquid level 34 in the tank. Manifold 30 has a plurality of orifices 35 directed radially inwardly of the tank. The outlet 28 between the area 20 around the pump and the manifold 30 comprises a flexible conduit for allowing up and down movement of the float with the water level.

The outlet 16 of the pump communicates with branched conduits 36 and 38 leading to a pair of respective heat transfer coils 40 and 42 supported on a cross bar 44 secured to the float 32. The coils 40 and 42 are intertwined spirally as shown in FIG. 3, the coil 40 having an outlet 46 leading to a condensing unit 48 and the coil 42 having an outlet 50 leading to this same condensing unit. Condensing unit 48 has a discharge end 51.

The intertwining relationship of the coils 40 and 42 provides even distribution of heat, as will be more apparent hereinafter, and furthermore to contribute to such even distribution, the inlet 36 to coil 40 is near the center and its outlet 46 is at the side. On the other hand, the inlet 38 to the coil 42 is at the side and the outlet 50 is at the center. Branch conduits 36 and 38 are flexible to allow up and down movement of the float.

A pair of sensors 52 and 54 of conventional construction are mounted in an auxiliary tank 56 secured to the main tank 10 and have communication therewith by a lower inlet opening 57 to maintain the liquid level 34 between certain limits, as will be more apparent hereinafter. These sensors are in a circuit 58 to an electrical control 60 for an outlet pump 62 communicating with the bottom of tank 10. A check valve 64 is provided downstream from the pump 62 to prevent air from entering the tank 10 when the pump 62 is stopped.

OPERATION

For initial functioning of the system, the vacuum pump 12 is started. As the pressure in the tank 10 decreases, the atmospheric pressure forces the water into the tank 10 through water conduit 22 and through water jacket 18, then through conduit 28 leading to circular manifold 30 and into tank 10 through orifices 35. This evacuates the tank 10 through the inlet 14 of the pump and through the outlet 16 to the heat transfer coils 40 and 42 and the condensing unit 48. In addition to evacuating the tank, vacuum from the pump continues to draw salinated water through the valve 24 and causes such incoming water to be discharged out the manifold 30, as designated by the arrows 66 in FIGS. 2 and 3. By utilizing a vacuum pump of the positive acting type, the system is capable of reducing the pressure to a low psi, such as in the 0.2 to 0.3 psi range, at which pressures water boils in the 35°-45° F. range. With the vacuum thus established and with the incoming water being heated above the boiling point by the heat of operation of the pump, and by latent heat of condensation the water discharged from the manifold 30 will vaporize. This vapor will be moved through the pump where it is heated by compression and through the branch lines 36 and 38 into the heat transfer coils where condensation is initiated, releasing the latent heat of condensation. Thereupon, the remaining vapor is forced into the condensing unit 48 with the condensate being discharged through discharge end 51.

The heat generated in the heat transfer coils 40 and 42 maintains the upper portion of the water in the tank at an elevated temperature with the cooler water being toward the bottom. The temperature derived from the operation of the pump thus offsets any cooling tendency from vaporization, and the heat from the pump, together with the latent heat of the condensation process in the coils 40 and 42, provides the efficient vaporization of the salinated water. The specific shape and disposition of the heat transfer coils 40 and 42 provide even distribution of heat in the tank.

Controls 52 and 54 provide limit positions for the water level, namely, as the water level 34 builds up in the tank, sensor 52 operates the control 60 to start the pump 62 and lower the water level. Sensor 54 shuts the pump off when the water level is at this sensor. Inflow is regulated so that it will not exceed capacity of outlet pump 62. A constant-level control may be an alternative means to regulate liquid level.

In accordance with the present invention, the specific arrangement of the positive acting vacuum pump and the heat transfer coils is considered to amount to a substantial improvement over prior systems. The vacuum pump is seen to provide five important functions, namely, draw water into tank 10, evacuate vapor from the tank 10 above the water level 34, heat the incoming water in the area 20, feed heated vapor to the heat transfer coils 40 and 42, and of course move the condensate through the coils 48. Thus, the only energy required is the energy to power the vacuum pump. The pickup means primarily utilizes heat generated by the vacuum pump but may also utilize solar energy and otherwise wasted excess heat from compressors, motors, refrigeration units, etc., such as those aboard ship or in industrial plants. The system does not require towers or other large equipment and thus is entirely portable. It can be manufactured in sizes ranging from less than 100 pounds to any size desired.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Apparatus for desalinating water comprising
   a tank for receiving water to be desalinated and for holding residual water at a selected level,
   said tank having upper and lower ends and defining side walls,
   a vacuum pump at the upper end of said tank having an inlet communicating with said tank for reducing the interior of said tank to a continuous subatmospheric pressure, to vaporize said water and for heating said water vapors while said water vapors pass therethrough,
   said pump also having an outlet,
   heat transfer means communicating with said pump outlet for receiving said heated water vapors and being submerged in said tank adjacent a water level in the tank,
   heat pickup means adjacent said pump for receiving heat generated by the operation of said pump,
   inlet means for water to be desalinated leading through said heat pickup means and providing discharge of inlet water at said heat transfer means above the water level for vaporization by heat from said heat transfer means which have been heated by heat generated by the change in pressure and heating of said pump,
   a float within said tank, said heat transfer means being mounted on said float and said inlet means terminating on said float,
   and condensing means leading from said heat transfer means for forming a condensate from water vapor forced into said heat transfer means from said pump outlet.

2. The apparatus of claim 1 wherein said heat pickup means comprises an insulated casing around said vacuum pump for efficiently picking up heat generated by operation of said pump.

3. The apparatus of claim 1 wherein said inlet means terminates in an outlet manifold on said float having a plurality of orifices directed radially inwardly of said tank over said heat transfer means.

4. The apparatus of claim 3 wherein a portion of said inlet means that extends between said pump and said float is movable up and down with said float.

5. The apparatus of claim 3 wherein said heat transfer means comprises coil means.

6. The apparatus of claim 3 wherein said inlet means includes a control valve for regulating the inflow rate of water entering said tank.

7. The apparatus of claim 3 wherein the outlet of said pump has at least two branch lines and said heat transfer means comprises at least two coils leading to said condensing means, one of said coils having an inlet centrally of said heat transfer means and an outlet adjacent said manifold and the other of said coils having an inlet adjacent said manifold and an outlet centrally of said heat transfer means to provide even distribution of vapor.

* * * * *